United States Patent [19]
Rappenecker

[11] Patent Number: 6,163,117
[45] Date of Patent: *Dec. 19, 2000

[54] ELECTRONICALLY COMMUTATED MOTOR AND METHOD OF CONTROLLING SUCH A MOTOR

[75] Inventor: Hermann Rappenecker, Vöhrenbach, Germany

[73] Assignee: Papst-Motoren GmbH & Co. KG, St. Georgen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/638,916

[22] Filed: Apr. 25, 1996

[30] Foreign Application Priority Data

May 2, 1995 [DE] Germany ............................. 195 15 944
May 13, 1995 [DE] Germany ............................. 195 17 665

[51] Int. Cl.$^7$ ...................................................... H02P 6/00
[52] U.S. Cl. ........................... 318/254; 318/138; 318/439
[58] Field of Search .................................... 318/138, 139, 318/245, 254, 439, 434, 696, 685, 701, 800, 807, 811

[56] References Cited

U.S. PATENT DOCUMENTS

| | | | |
|---|---|---|---|
| 4,385,265 | 5/1983 | Uzuka | 318/138 |
| 4,468,595 | 8/1984 | Yaebashi | 318/254 |
| 4,626,752 | 12/1986 | Fujisaki | 318/254 |
| 4,645,991 | 2/1987 | Ban et al. | 318/254 |
| 4,658,190 | 4/1987 | Miyazaki et al. | 318/254 |
| 4,763,049 | 8/1988 | Magee | 318/254 |
| 4,763,051 | 8/1988 | Ruppert | 318/254 |
| 4,777,419 | 10/1988 | Obradovic | 318/696 |

(List continued on next page.)

FOREIGN PATENT DOCUMENTS

| | | |
|---|---|---|
| 0 142 837 A2 | 5/1985 | European Pat. Off. . |
| OS 27 44 089 | 6/1978 | Germany . |
| OS 32 47 991 | 7/1983 | Germany . |
| 35 27 296 A1 | 9/1986 | Germany . |
| OS 40 28 089 | 3/1992 | Germany . |
| 42 15 812 A1 | 11/1993 | Germany . |
| 37 24 895 A1 | 2/1995 | Germany . |
| OS 44 41 372 | 6/1995 | Germany . |

OTHER PUBLICATIONS

John Babico, "3–Phase Brushless DC Motor Using A Single Sensor" *MOTOROLA Technical Developments*, vol. 9, pp. 56–57 (Aug.'1989).

(List continued on next page.)

*Primary Examiner*—Paul Ip
*Attorney, Agent, or Firm*—Milton Oliver; Ware, Fressola, Van Der Sluys & Adolphson LLP

[57] ABSTRACT

The present invention relates to a method of operating a three-or more-stranded electronically commutated motor which, to detect its rotor position, has a number of sensors which is fewer, by at least one, than the number of sensors intrinsically necessary for this number of strands for controlling the commutation, having the following steps: (a) within each range (120) of rotor positions in which an adequate association between sensor output signals and position is possible, a virtual rotor position signal (H3B') is derived from the output signals (H1, H2) of said rotor position sensors (37, 38), as a replacement for a sensor which is not present; (b) within each range (122, 124) of rotor positions in which an adequate association is not possible, an estimated value (H3B") is used for the virtual rotor position signal, which value is a function of an output signal (H1) of at least one of the existing rotor position sensors (37, 38). A preferred embodiment of the invention includes a RISC microprocessor which processes signals from two Hall sensors to derive a third "synthetic" sensor signal, representing rotor positions for which the two actual Hall sensors do not provide coverage. This has the advantage that the power consumed by the sensors, which sometimes exceeds that consumed by the motor itself, is reduced by up to one-third. Such power economy makes it practical to use motorized dampers in air-conditioning installations.

21 Claims, 13 Drawing Sheets

U.S. PATENT DOCUMENTS

| | | | |
|---|---|---|---|
| 4,841,204 | 6/1989 | Studer | 318/254 |
| 4,874,993 | 10/1989 | Tanaka et al. | 318/254 |
| 5,017,846 | 5/1991 | Young | 318/244 |
| 5,072,166 | 12/1991 | Ehsani | 318/696 |
| 5,155,419 | 10/1992 | Naito | 318/254 |
| 5,237,247 | 8/1993 | Naito | 318/254 |
| 5,264,775 | 11/1993 | Namuduri et al. | 318/811 |
| 5,320,421 | 6/1994 | Kade et al. | 303/100 |
| 5,376,866 | 12/1994 | Erdman | 318/254 |
| 5,585,703 | 12/1996 | Acquaviva | 318/439 |

OTHER PUBLICATIONS

Patent Abstracts of Japan, vol. 12, No. 13, (E–573) [2860], abstracting Yoshida/Brother JP 62–171490–A of Jul. 28, 1987.

Derwent WPI abstract of DE–OS 40 28 089–A1, Albrecht et al.

Derwent WPI abstract of DE–OS 44 41 372–A1, Jeske et al.

Microchip Technology, Inc., *PIC16C5X EPROM–Based 8–bit CMOS Microcontroller Series*, 1994, pp. 11–60.

Motorola, Inc., *Motorola Semiconductor Master Selection Guide Revision* 7, 1994, 1994, pp. 4.3–4 through 4.3–8.

R. Müller (R+D Director, Papst–Motoren), "Zweipulsige kollectorlose Gleichstrommotoren" [Two–pulse collectorless DC motors] in *ASR–Digest für angewandte Antreibstechnik*, 1977.

Sakmann, "A Brushless DC Motor Controlled by a Microprocessor with Examples for a Three–Phase Motor," *IEEE Transactions on Industrial Electronics*, vol. IE–34, No. 3, pp. 339–344, Aug. 1987.

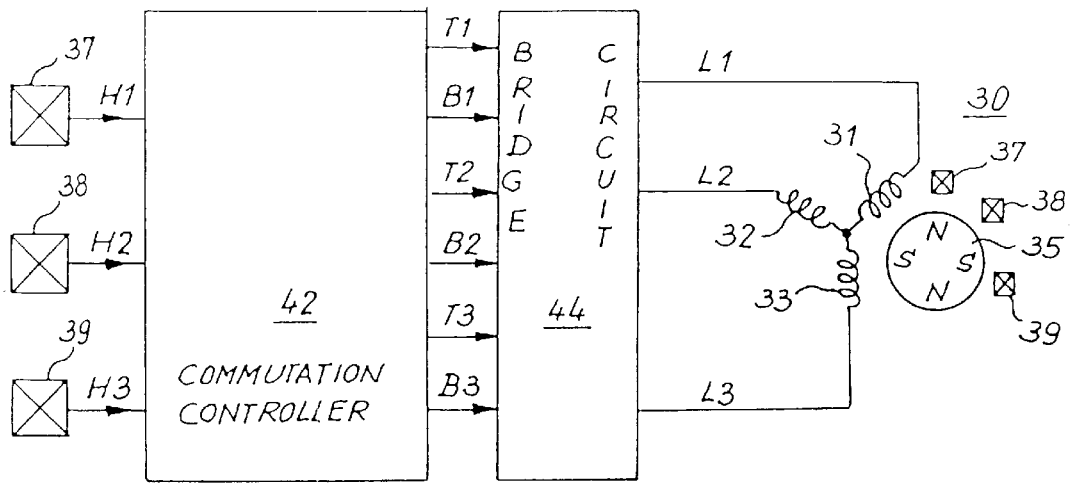
Fig. 1
PRIOR ART
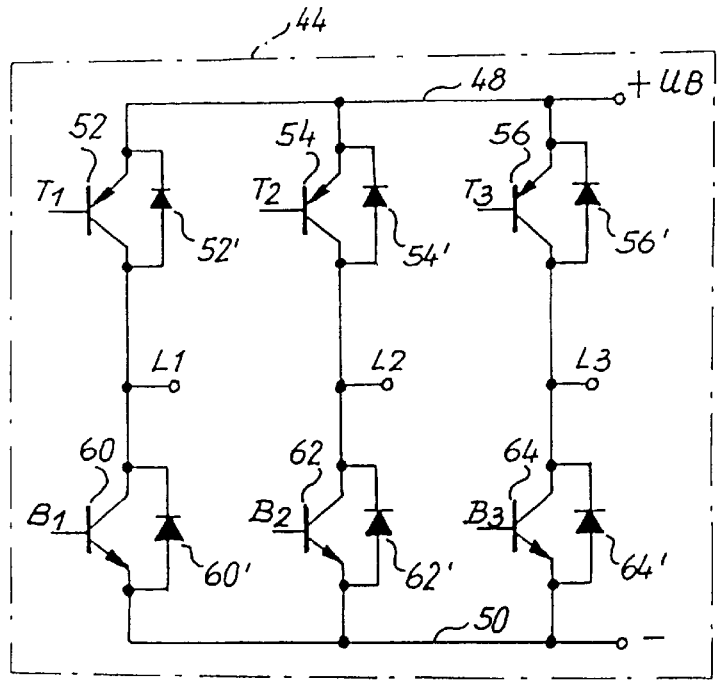
| $T1 = H1 \cdot \overline{H2}$ |
| $B1 = \overline{H1} \cdot H2$ |
| $T2 = H2 \cdot \overline{H3}$ |
| $B2 = \overline{H2} \cdot H3$ |
| $T3 = \overline{H1} \cdot H3$ |
| $B3 = H1 \cdot \overline{H3}$ |
Fig. 2A
Fig. 2B
PRIOR ART

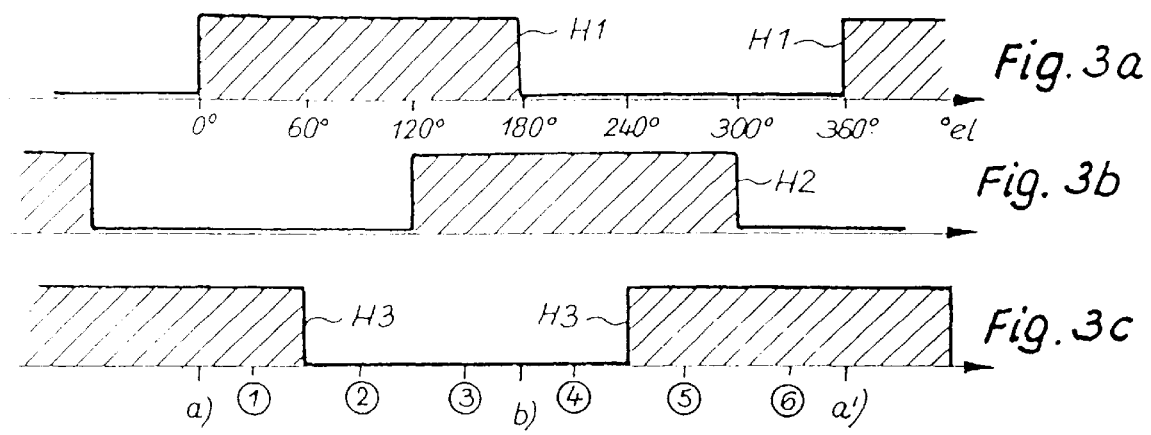

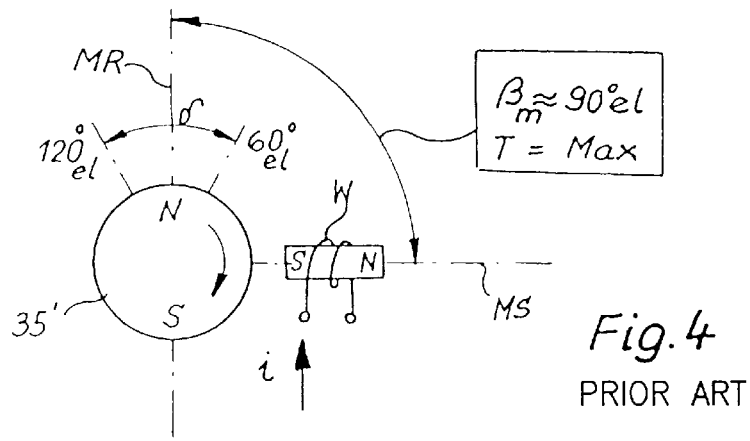
Fig. 4
PRIOR ART
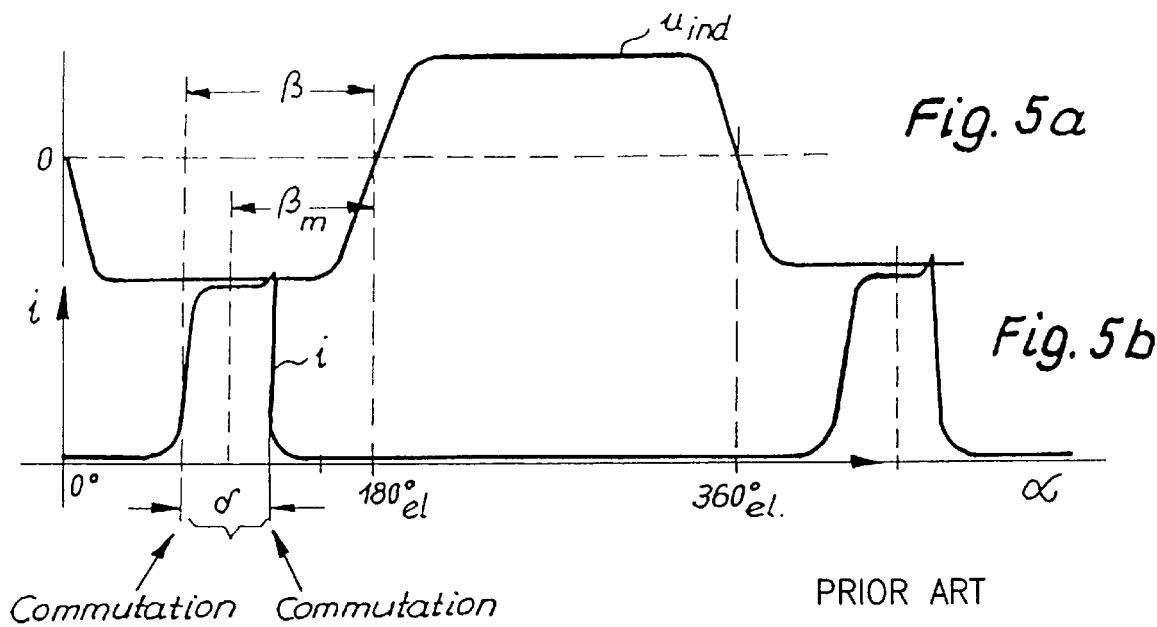
Fig. 5a
Fig. 5b
PRIOR ART
β = current flow phase
δ = current flow angle
β_m = mean current flow phase

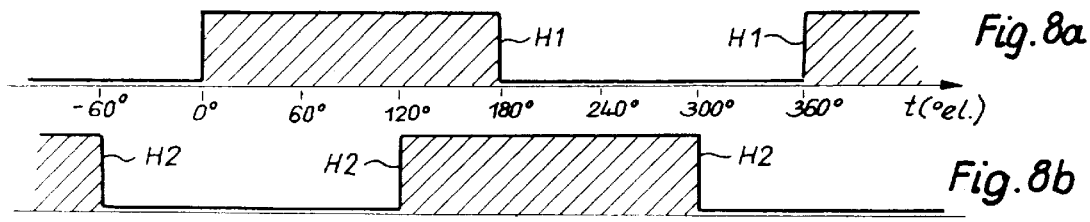
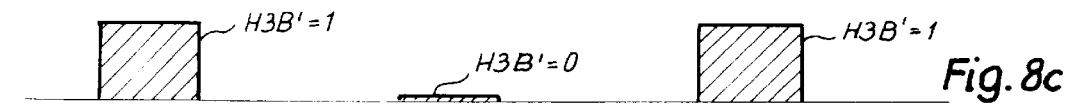
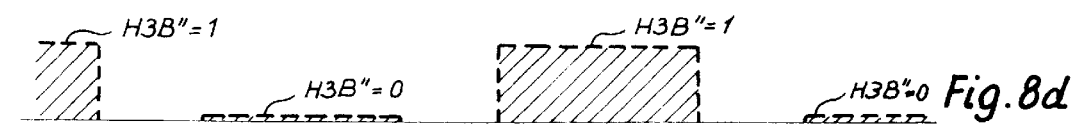
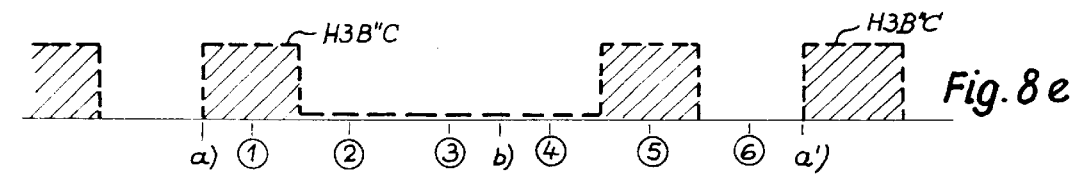
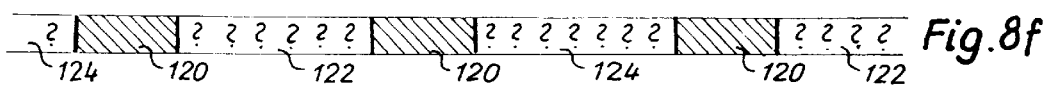
Fig. 8a, Fig. 8b, Fig. 8c, Fig. 8d, Fig. 8e, Fig. 8f, Fig. 8g, Fig. 8h

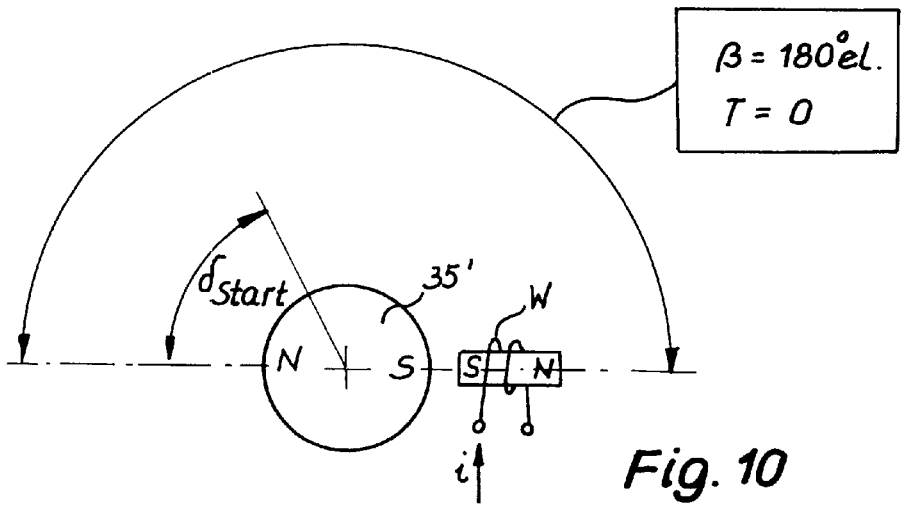
Fig. 10
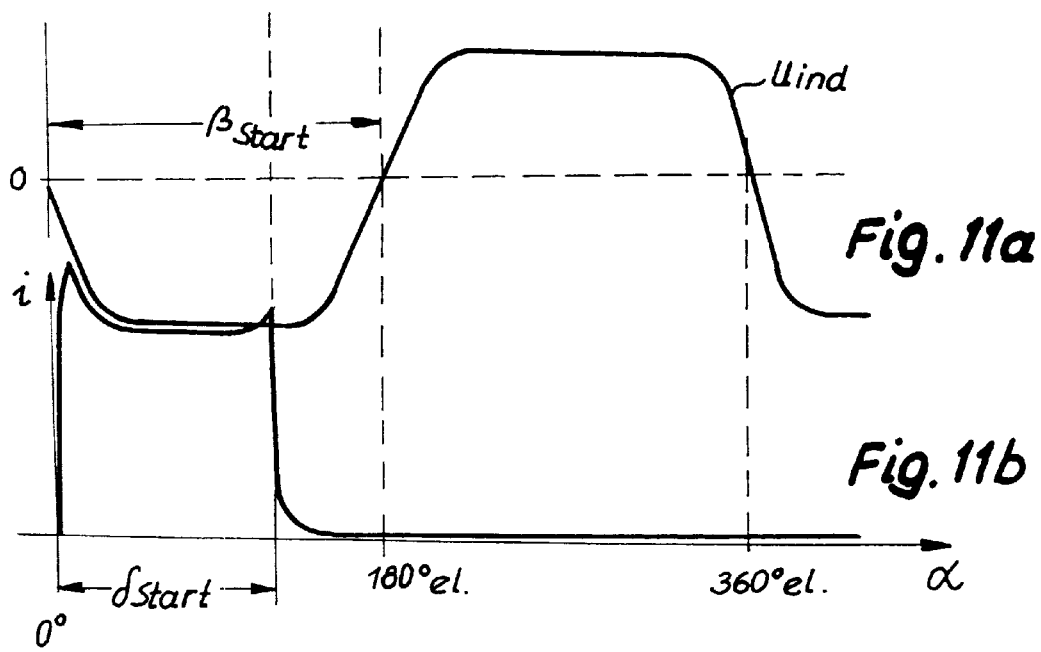
Fig. 11a
Fig. 11b

ELECTRONICALLY COMMUTATED MOTOR AND METHOD OF CONTROLLING SUCH A MOTOR

Cross-reference to related documents, incorporated by reference: *PIC16CSX EPROM-Based 8-bit CMOS Microcontroller Series*, pp. 1–60, @1994, Microchip Technology, Inc., Chandler, Ariz. 85224-6199; *Motorola Semiconductor Master Selection Guide, Rev.* 7, pp.4.3-4 through 4.3-8, @1994, Motorola, Inc., Phoenix, Ariz. 85036;

German Patent Application DE 44 41 372-A1, JESKE, KARWATH & RAPPENECKER, filed Nov. 21, 1994 and published Jun. 1, 1995, corresponding to EP 657 989-A1, published Jun. 14, 1995, U.S. Pat. No. 5,845,045, issued Dec. 1, 1998, and Japanese Published Application JP 7-194 169-A1 of Jul. 28, 1995.

FIELD OF THE INVENTION

The invention relates to a method of controlling an electronically commutated motor (ECM). It also relates to an electronically commutated motor and its control circuit.

BACKGROUND

In a three-strand ECM, in a conventional model, one requires three rotor position sensors, which are disposed at intervals of 120° el. from one another, or in other words at the stator positions of 0° el., 120° el., and 240° el., or (0°+n×360°) el., (120°+m×360°) el., etc., where m, n=0, 1, 2, . . . . Precisely in small-capacity motors, these sensors require a great deal of current, and this current consumption contributes nothing to the mechanical output of the motor and thus is a pure power loss which reduces the efficiency of the motor.

For instance, if a such a motor has three Hall ICs as rotor position sensors, each of which requires a current of 15 mA, then at an operating voltage of 40 V there is a power loss of 40×0.045=1.8 W, and this power loss can be substantially greater than the mechanical power output by the motor, which for instance is 0.5 W. This makes such a motor correspondingly inefficient.

The attempt has been made to circumvent this disadvantage by means of so-called sensorless technology, but it does not function in all cases with the desired reliability.

SUMMARY OF THE INVENTION

It is an object of the invention to furnish a novel method of operating an electronically commutated motor, and to furnish such a power-conserving motor.

According to the invention, this object is achieved by a method of controlling a three- or more-stranded electronically commutated motor, which to detect its rotor position has a number of rotor position sensors that is less by at least one than the number of rotor position sensors intrinsically necessary for this number of strands, having the following steps:
a) for the rotor position ranges in which an adequate association is possible, a virtual rotor position signal is derived from the output signals of the existing rotor position sensors;
b) for the rotor position ranges in which an adequate association is not possible, an estimated value is used for the rotor position signal, which value is a function of the output signal of at least one of the existing rotor position sensors.

Thus, while in a conventional design with a three-strand rotor, for instance, one must use three rotor position sensors, in the method of the invention one needs only two sensors, which correspondingly reduces current consumption and improves efficiency. Rotor position ranges exist for which the rotor position can be determined with accurate accuracy for motor operation with the output signals of only two (existing) sensors, and for these ranges the commutation presents no problem even on startup, as long as the rotor is located in such a range in starting, because from the signals of the existing rotor position sensors one can additionally derive a correct virtual rotor position signal. (In this connection, "virtual" means that although a corresponding sensor is not present, nevertheless a synthetically generated signal is used, which is likewise a function of the rotor position.)

Rotor position ranges also exist in which this virtual signal cannot be derived with adequate precision from the output signals of the existing sensors, because ambiguities exist; in other words, it is possible only very roughly to say in which (wide) rotor position range the rotor is located at that moment. In cases where a sufficiently unequivocal association is not possible, an estimated value is used for the virtual rotor position signal, and this estimated value is itself also a function of the output signals of the existing rotor position sensors. This permits greater power economy, and such power economy makes it practical to use motorized dampers in climate-control installations.

BRIEF FIGURE DESCRIPTION

Further details and advantageous further features of the invention will become apparent from the exemplary embodiments described below and shown in the drawings, which are to be understood in no way as a limitation of the invention. Shown are:

FIG. 1, the basic layout of an electronically commutated motor with three strands (phases), in accordance with the prior art;

FIG. 2A the basic layout of the bridge circuit used in the motor of FIG. 1, by way of which circuit the stator winding of this motor receives six current pulses per rotor revolution of 360° el.;

FIG. 2b shows the controlling of these pulses by the rotor position signals H1, H2, H3 of three rotor position sensors;

FIG. 3, for a rotor rotation of 360° el., the rotor position signals of the three rotor position transducers of the motor of FIG. 1, specifically in FIGS. 3a, b and c in the form of signals, in the table of FIG. 3g in the form of digital values, and in the table of FIG. 3h the control of the bridge circuit of FIG. 2B during the rotational angle of 360° el. (following that rotational angle, the entire process is repeated identically);

FIG. 4, a basic illustration to explain the current flow phase in an electronically commutated motor;

FIG. 5, a diagram which in conventional fashion shows the induced voltage in one strand (phase) of the motor of FIG. 1 (with trapezoidal magnetization of the rotor) at the top, and below it the current in this strand at a medium current flow phase of 90° el. and a current flow width of 60° el.;

FIG. 6, a circuit diagram of a preferred exemplary embodiment of an electronically commutated motor according to the invention; the stator windings, which are connected to the outputs L1, L2 and L3, may be formed identically to those of FIG. 1 and are therefore not shown;

FIG. 7, an enlarged view of the microprocessor, type PIC16CR57A made by Microchip Technology, Inc., Chandler, Ariz., which is preferably used in FIG. 6;

FIG. 8, diagrams to explain the circuit diagram of FIG. 6;

FIG. 9, a flowchart of the events that occur in constant repetition in operation of the motor of FIG. 6, in the microprocessor thereof, in order to commutate this motor correctly both upon starting and in operation;

FIG. 10, a basic illustration analogous to FIG. 4, to explain problems upon startup at certain exceptional rotor positions, of the kind that must be mastered for the motor of FIG. 6;

FIG. 11, a diagram similar to FIG. 5 for the motor of FIG. 6, which at the top shows the induced voltage in one strand (phase) (with trapezoidal magnetization of the rotor) and below that the current in this strand at a current flow phase of 180°, of the kind that can occur in the motor of FIG. 6 in certain starting positions, in order to explain the flowchart of FIG. 9;

FIG. 12, a diagram to explain the ongoing (correct) commutation with the motor rotating, to explain the flowchart of FIG. 9;

FIG. 13, a graphic to explain the flowchart of FIG. 9;

FIGS. 14*a* and 14*b*, diagrams to explain the intermittent power supply to the rotor position sensors;

FIG. 15, an illustration of details of program routine S159 shown in FIG. 9; and FIG. 16, a preferred variant of the invention, by means of which the motor efficiency can be still further increased.

DETAILED DESCRIPTION

Figure 6:
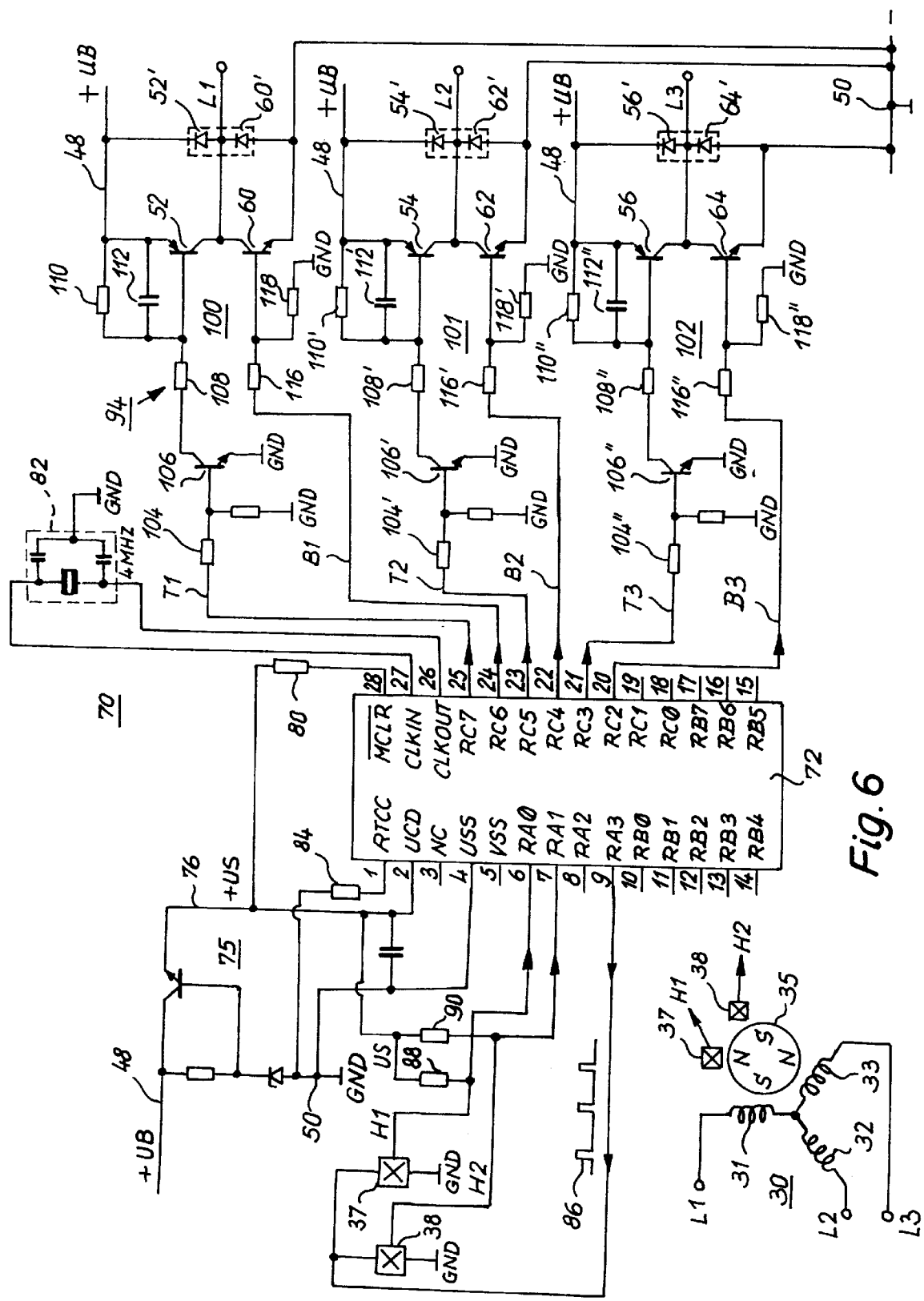

The present invention is difficult to understand, and a large number of graphic illustrations has therefore been used to make comprehension easier. Correct comprehension of this invention requires good knowledge of both electrical engineering and digital technology. The core concept of the invention is to economize on at least one of a number of rotor position sensors, and to replace it by intelligence, in the form of portions of the program of a microprocessor. This economy saves space in the motor; it saves one component and thus makes the motor less expensive; it also saves current and thereby improves motor efficiency, since the absent component also requires no current.

The foundations that appear necessary for understanding of the invention will first be explained in conjunction with FIGS. 1–5. FIG. 1 shows a three-strand electronically commutated motor ("ECM") 30 of the prior art. It has a stator winding with three strands 31, 32, 33, whose terminals are marked L1, L2, L3. These three strands, which are also known as phases, are shown here in a star or Y connection, that could equally well be in a delta or triangle connection. The permanent magnetic rotor of the motor 30 is suggested symbolically at 35, and disposed around it on the stator are three rotor position sensors 37, 38 and 39, at intervals of 120° el. (Since the rotor 35 shown is quadrupolar, 120° el. is equivalent to an angle of 60° mech.) These sensors are typically Hall ICs, which have a relatively high current requirement, such as 15 mA, and therefore severely worsen the efficiency in small motors.

These sensors 37, 38 and 39 are shown once again on the left in FIG. 1. Their output signals are marked H1, H2 and H3 and are supplied to a commutation controller 42 that outputs signals T1, B1, T2, B2, T3, B3, which are supplied to a full bridge circuit 44, to which the terminals L1, L2 and L3 of the windings 31, 32, 33 are connected.

FIG. 2B is a basic illustration of the layout of the bridge circuit 44 with bipolar transistors. Naturally MOSFETs (Metal Oxide Semiconductor Field Effect Transistors), Darlington transistors, and so forth, may be used here in the same way. A positive line having the potential +$U_B$ (for instance +40 V) is marked 48, and a negative line having the potential 0 V (GND) is marked 50. The three upper bridge transistors (52, 54 and 56) are pnp transistors, and a free-wheeling diode 52', 54' and 56', respectively, is connected antiparallel to each of them, as shown. The emitter of each is connected to the positive line 48, and the collector to the outputs L1, L2 and L3, respectively. At their base, these three upper transistors receive the signals T1, T2 and T3, as can be seen from FIG. 2A. For instance, if the Hall IC 37 has the output signal H1=1 and the Hall IC 38 has the output signal H2/=0, then the transistor 52 is conducting, and the transistors 54 and 56 are blocked.

The lower bridge transistors 60, 62 and 64 are npn transistors; their emitters are connected to the negative line 50 and their collectors to the outputs L1, L2, L3, and one free-wheeling diode 60', 62', 64' is connected antiparallel with each of them. At their base, these lower transistors receive the signals B1, B2 and B3, as shown in FIG. 2A.

It need not be emphasized that this is merely an exemplary embodiment, and that these things are described so that the reader can understand the invention with the aid of a concrete example.

FIGS. 3*a*, 3*b* and 3*c* show the three sensor signals H1, H2, H3, which are offset from one another by 120° el. each. The numbering is chosen such that H1 changes from "0" to "1" at the angle 0° el. from "1" to "0" at 180° el., and back from "0" to "1" again at 360° el.; that is, when the rotor 35 rotates by 360° el., the result is the signals shown in FIG. 3*a*, 3*b* and 3*c*. The function of these signals is to provide the commutation controller 42 with the information as to what rotary position the rotor 35 is located in at that moment.

This information about the rotary position is merely a rough approximation, since the commutation controller 42 requires only this rough information; in other words, it must know the following:

Is the rotor 35 located in the rotary position range from 1° to 60° el.? This position range is symbolized in FIG. 3*c* by the number (1).

Or, is the rotor 35 in the range from 61° to 120° el.? This position range is symbolized in FIG. 3*c* by the number (2).

Or, is the rotor 35 in the range from 121° to 180° el.? This position range is symbolized in FIG. 3*c* by the number (3).

Or, is the rotor 35 in the range from 181° to 240° el.? This position range is symbolized in FIG. 3*c* by the number (4).

Or, is the rotor 35 in the range from 241° to 300° el.? This position range is symbolized in FIG. 3*c* by the number (5).

Or, is the rotor 35 in the range from 301° to 360° el.? This position range is symbolized in FIG. 3*c* by the number (6).

For the rotary position range from 1° to 60° el., the three sensors furnish the signal combination H1, H2, H3=101, for instance, as shown in FIG. 3*g;* and as shown in FIG. 3*h* the effect of this signal combination is that the signals T1 and B2 become high; that is, the transistors 52 and 62 are turned on in the bridge circuit 44, so that a current flows from the positive line 48 via the transistor 52, the strands 31 and 32, and the transistor 62 to the negative line 50.

In the ensuing rotary angle range from 61° to 120° el., the rotor position information is H1, H2, H3=100, and its effect is that the signals T1 and B3 become high, and as a result the transistors 52 and 64 are turned on, and a current flows via the strand 31 and the strand 33 from the positive line to the negative line.

The reader thus understands that in this example, the bridge circuit 44 is switched over after each rotor rotation of 60° el. In electrical engineering, this switchover is called commutation. The purpose of this is to control the current to the three strands 31, 32, 33 of the stator in such a way that the magnetic field generated by the stator winding always leads ahead, by a certain angle, of the field of the permanent magnetic rotor 35 and therefore "pulls it forward" in the desired direction or, in other words, drives it. This angle is called the "mean current flow phase."

FIG. 4 shows this in a basic illustration. In this case, the permanent magnetic rotor 35' is shown bipolar, and only a single stator winding W is shown. The magnetic field MR of the rotor 35' has a vertical course, and the magnetic field MS of the stator has a horizontal course; that is, an angle of 90° el. is located between them, and this angle is called the mean current flow phase. At a value of 90° el., a maximum value for the torque T of the motor occurs, and one therefore attempts to adhere to this value.

FIG. 5a shows the induced voltage $u_{ind}$, which is induced in the winding W by the rotor magnet 35' of FIG. 4 upon its rotation. FIG. 5B shows the current i that flows into the winding W for instance during a current flow angle of 60° el. and which accordingly begins in FIG. 4 at a current flow phase of 120° and ends at a current flow phase of 60°. At the beginning of such a current pulse i of the kind shown in FIG. 5b, a commutation occurs, as at its end, as represented by these captions in FIG. 5. In the motor of FIGS. 1–5, the current pulses usually have a length of 60° el.; that is, per revolution of 360° el., a total of six such current pulses are supplied to the strands 31, 32, 33, one always following the pulse preceding it, and this is why the motor of FIGS. 1 and FIG. 2B can also be called a three-strand, six-pulse motor. It should be pointed out that the invention is not limited to such motors but instead is equally suitable with motors of other numbers of strands and other numbers of pulses, such as three-strand, three-pulse motors. For comprehension purposes, however, it appears expedient to describe the invention in terms of one specific example.

It should also be pointed out that control processes may cause the current pulses i to be shorter than 60° el., for instance as the result of speed control or PWM (Pulse Width Modulation) control.

FIG. 6 shows a circuit diagram of a motor arrangement 70 according to the invention. The motor 30 itself is once again a three-strand, six-pulse motor and is shown, for reasons of space, at the bottom left of FIG. 6.

The special feature of the motor arrangement 70 is that it requires only the two rotor position sensors 37 and 38 of FIG. 1, which furnish the signals Hi and H2, but not the third rotor position sensor 39, which has been left out here.

However, as has just been explained in detail, a triplet of digital signals Hi, H2, H3, for instance 100 or 001, is needed for the information about the rotor position, and the third signal H3 is therefore calculated internally, in the motor arrangement 70, from other information. It can therefore also be called a "virtual" rotor position signal. From this virtual signal H3B and the actually existing signals H1 and H2 from the sensors 37 and 38 present, the commutation of the motor 30 can be controlled in precisely the same way as has been described in great detail for FIGS. 1–5.

Figure 7:
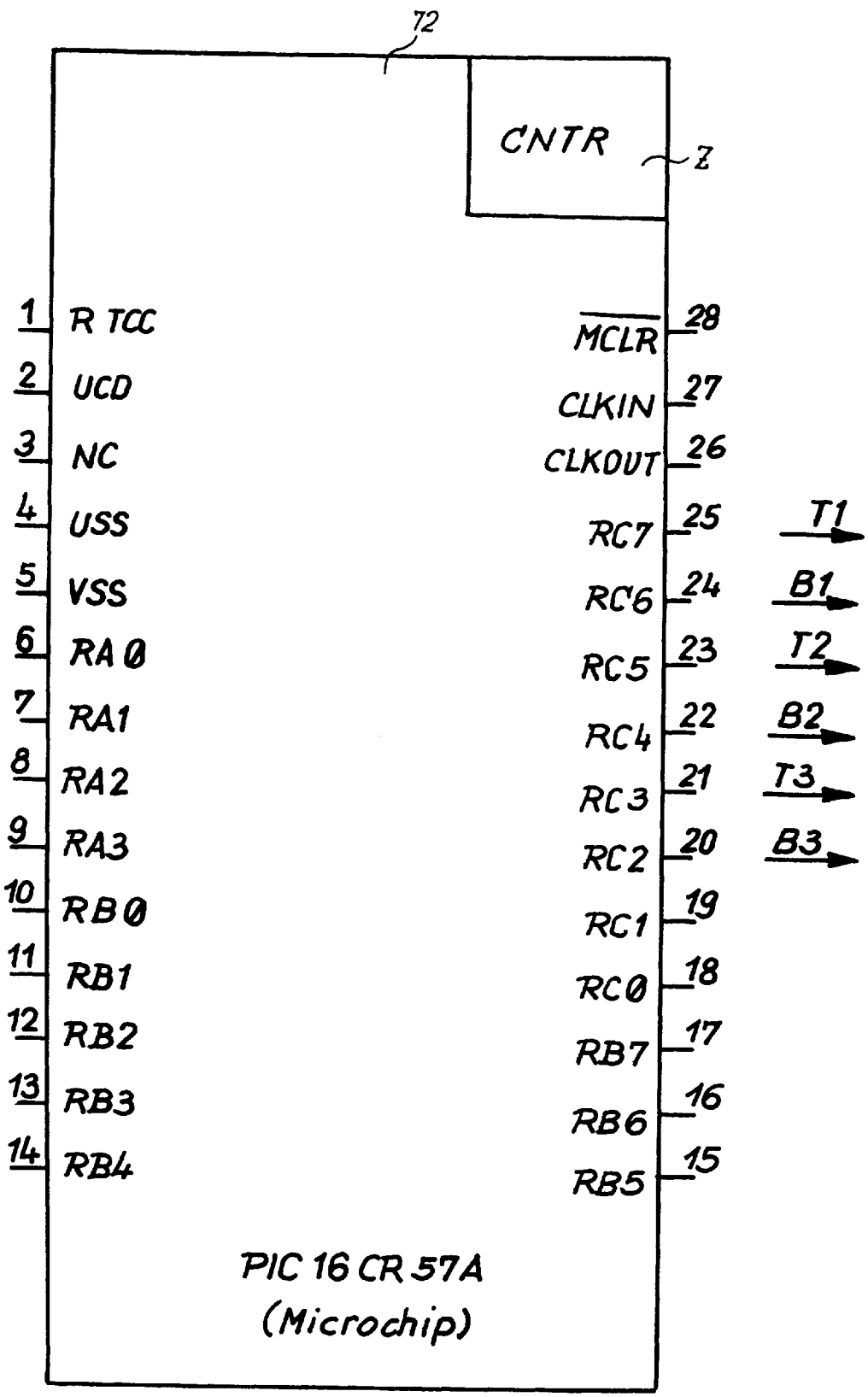

The arrangement 70 of FIG. 6 uses a microprocessor ($\mu$P) 72, which is shown on a larger scale in FIG. 7. FIG. 7 shows the terminals 1–28 of this $\mu$P and their designations chosen by the manufacturer (Microchip Technology, Inc. of Chandler, Ariz.), and the reader is referred to the associated PIC 16CR 57A specification sheets, identified at the beginning of this text. The $\mu$P 72 also contains a ROM, in which the program used for controlling the $\mu$P is located, and a RAM for storing volatile data, such as limit values for a counter, and so forth. This $\mu$P is a RISC (Reduced Instruction Set Computer) processor. Naturally, many kinds of microprocessors may be used here; the main goal is to use an inexpensive $\mu$P with a low current consumption that is capable of withstanding the temperatures in a motor (the $\mu$P 72 is usually built directly into the housing of the motor and forms a component thereof).

For power supply to the $\mu$P 72, beginning at the positive line 48, a regulated power supply 75 is used, which at its output 76 furnishes a volt+$U_S$ of +5 V, for instance. The negative line 50 is partly also designated as GND. The input 2 of the $\mu$P 72 is connected directly to the output 76, and the input 28 is connected via a resistor 80. Connected to the inputs 26 and 27, as shown, is a quartz oscillator 82 (4 MHz, for instance), which acts as a clock generator for the $\mu$P 72. The input 4 is connected directly to the negative line 50, and the input 1 is connected via a resistor 84 with a resistance of 100 k$\Omega$, for instance. The output of the Hall IC 37 is connected to the input 6 and supplies the signal Hi to it. The output of the Hall IC 38 is connected to the input 7 and supplies the signal H2 to it. The positive inputs of the Hall ICs 37 and 38 are connected both to one another and to the terminal 9 of the $\mu$P 72. From there, they receive periodic current pulses 86 with a duration of 7 $\mu$s, for instance, and with a chronological spacing of 50 $\mu$s, for instance. By means of these current pulses 86, the Hall ICs 37 and 38 are always turned on only briefly, and then briefly supply the signals H1 and H2, which are stored in the $\mu$P 72 until the next current pulse 86 and on the next current pulse 86 are replaced by the then-occurring new signals H1 and H2. Via resistors 88, 90 (of 22 k$\Omega$ each, for instance), which are called "pullup resistors," the inputs 6 and 7 of the $\mu$P 72 are connected to the output 76 of the voltage regulator 75.

Figure 14:
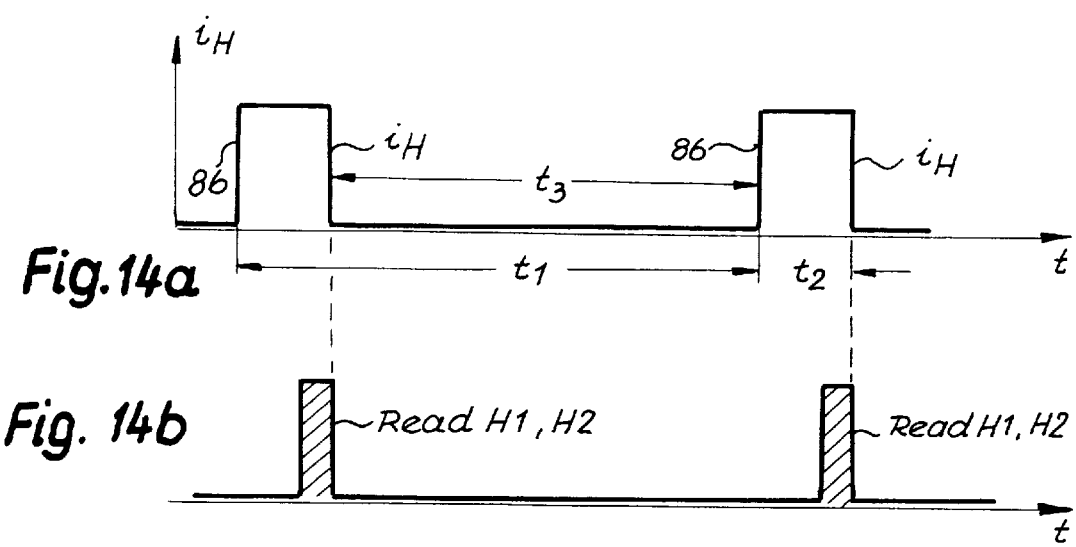

FIG. 14a shows the generation of the current pulses 86 by the Hall ICs 37 and 38. The pulse length $t_2$ is 7 $\mu$s, for instance, and the pulse spacing $t_1$ is 50 $\mu$s, for instance. The readout and storage in memory of the signals H1, H2 is done for instance during the last two microseconds of the pulses 86, as shown in FIG. 14b. Since the Hall ICs 37, 38 are thus currentless during 80% of the total time, for instance, the result is a corresponding energy savings. Since the sampling or interrogation according to FIG. 14b takes place from 10,000 to 20,000 times per second, for instance, even at relatively high rpm levels the Hall signals H1 and H2 are available sufficiently often to enable exact commutation.

In operation, the output 25 of the $\mu$P 72 furnishes the signal T1, the output 24 the signal B1, the output 23 the signal T2, the output 22 the signal B2, the output 21 the signal T3, and the output 20 the signal B3, as shown in FIG. 6. These signals serve as in FIG. 2b for controlling a full bridge circuit 94, whose basic layout is equivalent to FIG. 2B. That is, the signals T1, B1, T2, B2, T3 and B3 are calculated in precisely the same way from the signals H1, H2 and the (virtual) signal H3B as has already been described in detail in conjunction with FIGS. 1–5.

The full bridge circuit of FIG. 6 has the same basic layout as the full bridge circuit 44 of FIG. 2b. The same reference numerals are therefore used for the same or identically functioning parts and by convention will not be described again here.

As FIG. 6 shows, the bridge circuit 94 includes three elements 100, 101 and 102 of identical layout. Therefore only the element 100 will be described below. The corresponding components of element 101 are assigned the same reference numerals followed by a' and those of element 102 the same reference numerals with a".

Signal T1 is carried via a resistor 104 to the base of an npn transistor 106, whose emitter is connected to the negative line 50 (GND) and whose collector is connected via a resistor 108 to the base of the pnp transistor 52, whose emitter is connected to the base via a resistor 110 and a capacitor 112 parallel to it (of 4.7 kΩ and 1 nF, for instance). The resistor 110 and the capacitor 112 form an RC member and slow down the switching events of the transistor 52, in order to avoid turn-off peaks or spikes, and radio-frequency interference.

In the same way, the signal T2 is supplied to the base of the transistor 106' via the resistor 104', and the signal T3 is supplied to the base of the transistor 106" via the resistor 104".

If the signal T1 of the output 25 of the microprocessor 72 assumes the logical value "1", the transistor 106 becomes conducting and produces a base current in the upper bridge transistor 52, so that transistor 52 becomes conducting as well. Conversely, if the signal T1 becomes low or in other words assumes the logical value "0", then the transistors 106 and 52 are blocked.

The same is analogously true for the signal T2 at the output 23 and the signal T3 at the output 21 of the microprocessor 72.

The signal B1 of the microprocessor 72 is supplied via a resistor 116 (4.7 kΩ, for instance) directly to the base of the transistor 60. This transistor is connected in turn via a resistor 118 (4.7 kΩ, for instance) to the negative line 50.

Thus if the signal B1 at the output 24 of the microprocessor 72 assumes the logical value "1", the transistor 60 becomes conducting, and when it assumes the value "0" this transistor is blocked. The same is analogously true for the signals B2 and B3, which requires no explanation because the arrangements match one another in layout.

FIG. 8a shows the output signal H1 of the Hall IC 37 and FIG. 8b the output signal H2 of the Hall IC 38. The illustration is exactly equivalent to FIGS. 3a and 3b, as is the numbering of the rotary position ranges below FIG. 8e, which matches the numbering of the rotary position ranges of FIG. 3c.

From FIGS. 3a, b, c, one learns directly that the signals H1, H2, H3 can never simultaneously assume the values 000 or 111, and from this it follows in FIG. 8c directly that for the range from 59° to 0° el. and from 301° to 360° el. (rotary position range (6)), the "virtual" output signal H3B of the (absent; omitted) third sensor must be equal to "1". It also follows directly that in the rotary position range (3) (121° to 180° el.), the signal H3B must be equal to zero. In these rotary position ranges, complete rotary position information is accordingly available, which makes it possible to start the motor with full torque and in the correct rotational direction. Accordingly, if the rotor is in one of these rotary positions that is hatched in FIG. 8f and identified by reference numerals 120, then problem-free starting is possible. FIG. 8f also shows, however, that between these "safe" ranges 120 there are larger rotary position ranges 122, 124, which are marked with question marks. These are rotary position ranges in which the rotary position information is not adequate to assure starting with full torque at all times.

In the ranges 122, the rotor position signal H1, H2=10, and in the ranges 124, the rotor position signal H1, H2=01; that is, the signal 10 means that the rotor 35 is located somewhere between 0° and 120° el., and the rotor position signal 01 means that the rotor 35 is located somewhere between 180° and 300° el. These items of information are not sufficiently precise for reliable starting of the motor with full power.

From FIG. 3c, one sees that in range 122, the virtual signal H3 may be either "1" or "0", and that in range 124, once again, the virtual signal H3 may be either "0" or "1".

Until now, this uncertainty has led professionals in this field always to use three sensors in such motors, as shown in FIG. 1, to assure reliable starting and ensuing operation of the motor. In the present invention, this reliable starting and operation are also assured if one of the three Hall sensors is omitted. It does not matter for the invention which of the three sensors this is. The invention can also be adopted for other electronically commutated motors, in which a larger number of rotor position sensors is needed, so that there, as well, at least one of these sensors can be left out and replaced by the program in a microprocessor.

The invention takes the following path here: For the rotary position range 122—for the direction of rotation shown here—the value "0" is chosen as the estimated value for the virtual signal H3B", as shown in FIG. 3d, and for the rotary position range 124, the value "1" is chosen as the estimated value for the virtual signal H3B"; see FIG. 3d. This is accordingly the complementary value of H1 for this direction of rotation.

Thus if the rotor 35 upon starting is in the rotary position range (2) (61 to 120° el.), then the $\mu$P 72 generates the correct rotary position information, since then the signal combination H1, H2, H3B=100 is correct, and the start proceeds normally.

The same is true if the rotor 35 on starting is in the rotary position range (5) (241 to 300° el.). Once again, the $\mu$P 72 generates a correct rotary position information H1, H2, H3B=011, and the start proceeds normally, with full torque.

Accordingly the rotary position ranges (1) (1 to 60° el.) and (4) (181 to 240° el.) remain, for which the $\mu$P 72—because of the estimation for the value H3B—receives incorrect rotary position information, specifically:

If the rotor 35 is in the rotary position range (1) (1 to 60° el.), the microprocessor generates the (wrong) rotary position information H1, H2, H3B=100, which is actually pertinent for the rotary position range (2) (61 to 120° el.). As a result, while upon starting a drive of the rotor 35 is effected in the correct direction of rotation, nevertheless it is with reduced torque, which becomes weaker, the closer the rotor 35 on starting is to the rotary position of 0° el., which is marked a) in FIG. 8e.

If the rotor 35 is in the rotary position range (4) (181 to 240° el.), the microprocessor generates the (wrong) rotary position information H1, H2, H3B=011, which is actually pertinent for the rotary position range (5) (241 to 300° el.). As a result, while upon starting a drive of the rotor 35 is effected in the correct direction of rotation, nevertheless it is with reduced torque, which becomes weaker the closer the rotor 35, on starting, is to the rotary position of 180° el., which is marked b) in FIG. 8e.

The positions a) and b), that is, 0° el. and 180° el. are accordingly the rotary positions which make for the most frustrating problems upon starting; in this case, because a motor must naturally be able to start reliably from all rotary positions, even if these rotary positions might perhaps occur only rarely in practice.

These starting problems will be explained in conjunction with FIGS. 10 and 11 in terms of a simplified model, to enable the specialist in digital technology as well to understand the invention.

Starting in one of the rotary positions a) and b) is equivalent to the arrangement of FIG. 10; that is, the current flow phase on turn-on amounts to a full 180° el., and a south pole of the rotor (35') is located directly opposite a south pole of the stator (winding W). As can be seen, in this position, no torque on the rotor 35' can be generated, even if the current i in the winding W becomes very high.

This rotary position is the position in which, in FIG. 11a, the induced voltage $u_{ind}$ has the value of 0. Wherever this voltage has the value of zero, the motor cannot generate any torque.

If the motor in FIG. 10 is turned on when its rotary angle α is 5° el., for instance, then a torque—although very weak—is generated, since the current flow phase is then only 175° el., and the current i is maintained—without commutation—up to the angle α=120° el. Commutation is done for the first time at the rotary position of 120° el., and from then on, the reliable rotary position information H1, H2, H3B=110 is available, so that the motor can start reliably once it has overcome the "dry stretch" of α=0° to 60° el.

The situation is analogous for startup at position b).

If the rotor 35 on startup is at the position 1° el. or 181° el., then it can happen that the torque generated is so low, for the reasons explained, that no startup can occur.

In that case, the $\mu$P 72 checks whether a commutation occurs, that is, whether one of the signals H1 or H2 changes, within a predetermined period of time, for instance of 30 ms. If that is not the case, this means that the motor has not started up, or in other words must be in the vicinity of position a) or position b).

From the signals H1 and H2, the $\mu$P 72 knows whether the rotor 35 is in the rotary position range 122 (1° to 120° el.) or in the rotary position range 124 (181 to 300° el.); that is, it knows that the start that has not occurred is a consequence of either the rotary position a) (H1, H2=10) or of rotary position b) (H1, H2=01). In the case where H1, H2=10, the $\mu$P 72 in this case changes the virtual signal of H3B"=0 to the complementary value H3B"C=1. As a result, a startup with full torque is immediately possible, since the correct information about the rotor position, and thus the situation of FIGS. 4 and 5, is now present.

In the case where H1, H2=01, the $\mu$P 72 upon non-starting changes the virtual signal of H3B"=1 to the complementary value H3B"C=0, which is shown in FIG. 8e. As a result, once again startup at full torque is immediately possible, since now the correct information about the rotor position, and thus the situation of FIGS. 4 and 5, is available.

The motor of the invention accordingly starts in most cases directly and without delay. In the range of rotor positions a) and b), for the reasons explained, a delay in starting of 30 ms, for instance, may occur, but in practice this is not a problem and is not perceptible. Once the motor has started, the rotation is maintained in any event; and how this is optimally done will be discussed at length hereinafter. First, however, the flowchart of FIG. 9 will be explained; with the aid of this program, the startup is reliably accomplished, even though, instead of three rotor position sensors, only two of them are used.

Figure 9:
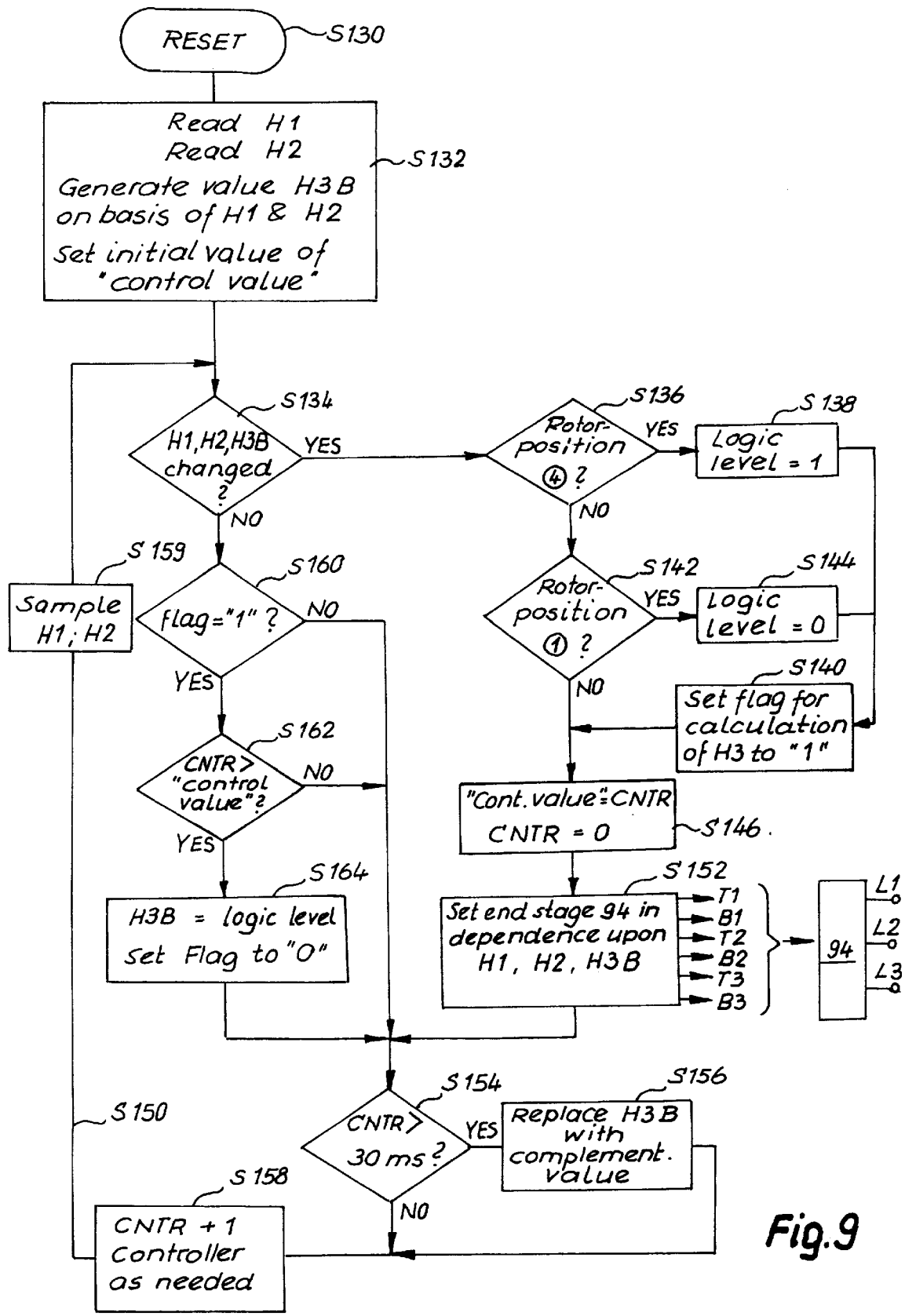

FIG. 9 shows the flowchart for the commutation of the motor 30 of FIG. 6. This flowchart is shown for only one direction of rotation.

When the motor 30 is turned on, a reset operation, the so-called power up reset, first takes place in step S130. As a result, the various registers of the $\mu$P 72 and the program counter are set to zero.

Initialization takes place in step S132. The values H1 and H2 of the Hall ICs 37 and 38 are read out, by the delivery of a current pulse 86 from the $\mu$P 72 to these ICs. Next, both values are stored in memory in the $\mu$P 72. On the basis of these two values, the $\mu$P 72 calculates a value for H3B, if possible; that is, if H1, H2=00, then the calculation is that H3B'=1, and if H1, H2=11, the calculation is that H3B'=0. For the other pairs of values for H1, H2, H3B" is set equal to H1/, that is, the complementary value of H1. The calculated value H3B is accordingly composed of H3B' and H3B"; only H3B' is a secure value, while H3B" is an optimized estimated value.

An initial value is also set for the "control value" variable. "Control value" in operation corresponds to the time required by the rotor 35 to make a rotation of 60° el. This will be described in further detail below in conjunction with FIG. 13. On starting, the rotor 35 initially rotates only slowly, and therefore this initial value must be correspondingly high. (As soon as the rotor 35 is turning, the "control value" variable is measured continuously, and the current value at any given time is used.)

In step S134, a check is made whether H1, H2 or H3B has changed. This is always the case upon starting, so that the program goes to step S136. There a check is made as to whether the rotor 35 is in the rotor position range (4) (FIG. 8e), or in other words whether the signal H1 has changed from "1" to "0". If so, then in step S138 a logic level is set to "1". (The logic level is a variable, namely a bistable flip-flop, which can assume only the values of "0" or "1".) If the rotor is in the range (4), then the logic level is set to "1" in step S138, and in step S140 a flag is set to "1"; this indicates that, in the ensuing steps S162, S164, the value for H3B is to be changed if a certain condition is met.

If it is found in step S136 that the rotor is not in the rotor position range (4), then the program goes to step S142 and checks whether the rotor 35 is in the range (1), or in other words whether the value H1 has changed from "0" to "1". If the answer is yes, then in step S144 the logic level is set to "0", and then in step S140 the flag is set to "1", to indicate that in the ensuing steps S162, S164, the value for H3B is to be changed.

If the rotor 35 is not in range (4) or (1), then the answer in both step 136 and step 142 is no, and thus the logic level is not changed and in step S140 the flag is not set.

Step S142 is followed by step S146. There, the "control value" variable is specified as an upper limit value in a counter Z of the $\mu$P 72, and this counter Z is set to "0". This counter Z, symbolically shown in FIG. 7, accordingly always counts beginning at a commutation time, for instance K1 in FIG. 13, as indicated there by an arrow; at the next commutation time K2, it is reset to zero and then counts from K2 on, and so on in cycles. This counter Z may also be a separate counter, which will have the advantage that the resolution becomes very good and the motor runs very quietly. However, the counter may—as shown in the flowchart—also count the number of loops S150 that the program of FIG. 9 runs through from the time of the zero setting in step S146. These loops S150 have a duration of 50 $\mu$s, for instance; that is, if 10 loops S150 are run through, for instance, then one knows that a time of 10×50 $\mu$s=0.5 ms has elapsed. The prerequisite for this is naturally that each passage through a loop S150, over whatever course, takes the same time; that is, in the flowchart of FIG. 9, corresponding ineffective but time-consuming commands must be found at individual points, examples being NOP (NO OPERATION) commands, as shown in FIGS. 22 and 23 of German Patent Disclosure DE 44 41 372 A1 and U.S. Ser.

No. 08/341,380, filed Nov. 17, 1994, now U.S. Pat. No. 5,845,045, JESKE, KARWATH & RAPPENECKER, now U.S. Pat. No. 5,845,045, which generally corresponds.

In step S152, the signals H1, H2 and H3B" are evaluated, in the manner shown in FIG. 2A, in order depending on rotor position to generate the correct combination of signals T1, T2, T3 and B1, B2, B3, as shown in the table of FIG. 8h. As this table shows, the problems in startup arise in the range from 1 to 60° el. because it is there, because of the (wrong) estimated value H3B"=0 upon startup that the signal B3 is generated, instead of the (correct) signal B2, and in the range from 181 to 240° el., the startup problems arise because as a result of the wrong estimated value H3B"=1, the (wrong) signal T3 is generated instead of the signal T2. By the already-described formation of the complementary signal H3B"C, this wrong estimated value is corrected within a short time by the program logic, if the motor, with the wrong estimated value, fails to start.

The signals T1–B3 are supplied, as suggested in FIG. 9, to the full bridge circuit 94, to whose outputs L1, L2, L3 the motor 3 (FIG. 6, bottom left) is connected.

Step S152 is followed by step S154, where the counter state of the counter Z is checked. If more than 30 ms have elapsed, then the estimated value H3B" is interpreted as "wrong", and in step S156 it is replaced with its complementary value H3B"C, as a result of which the motor then starts with full torque, unless it is mechanically blocked.

In step S158, the counter Z is counted upward by the value 1, and the program returns via the loop S150 to the step S134. In step S158, or following it, closed-loop control processes can occur as needed, as described in DE 44 41 372 A1. In step S159, the signals H1, H2 are briefly re-interrogate (polled) from the Hall ICs 37, 38, in that a current pulse 86 (FIG. 6) is sent to them, and these signals are buffer-stored in the μP 72.

Figure 15:
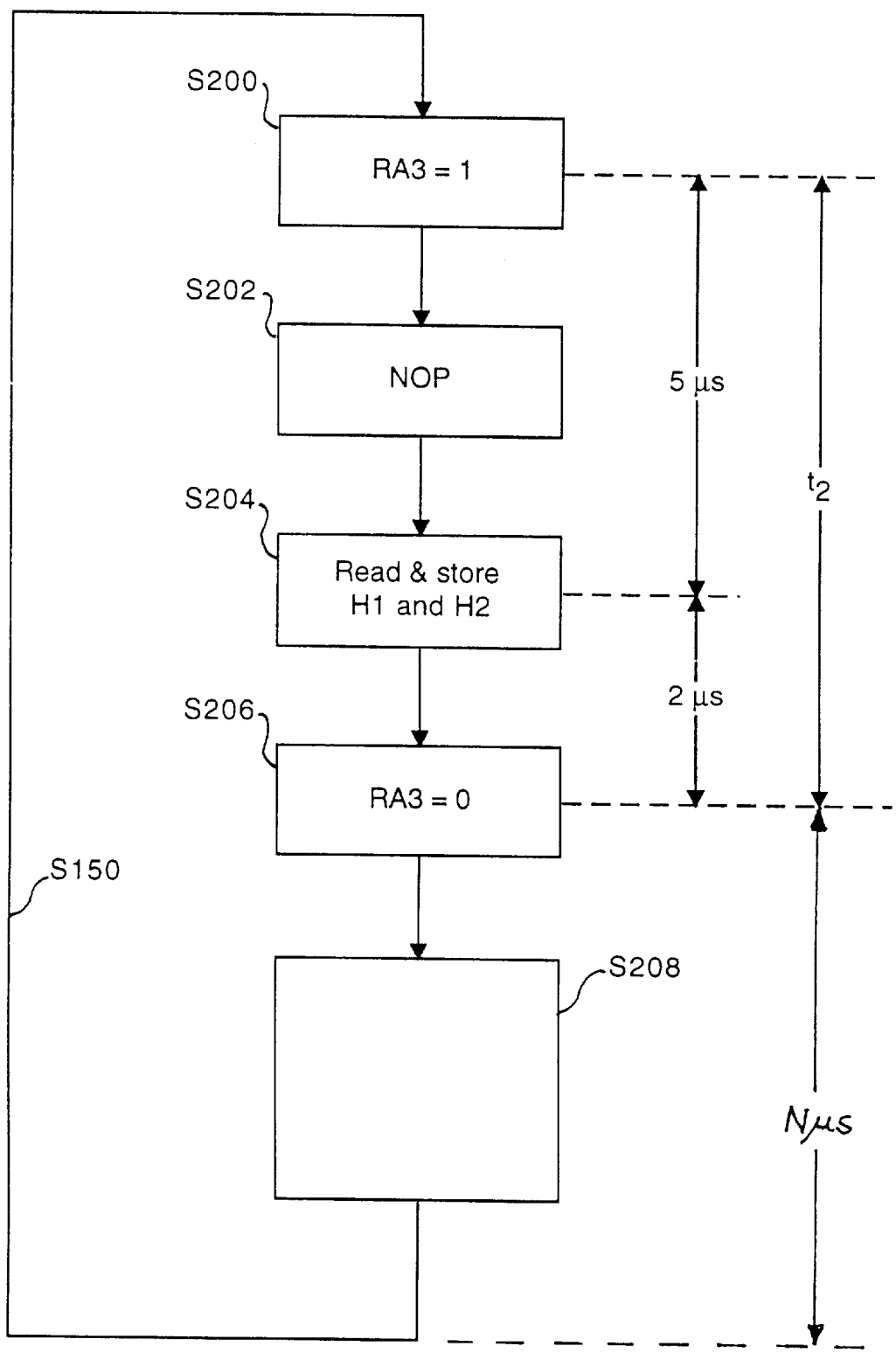

This is shown in FIG. 15. There, in step S200, the output RA3 of the μP 72 is switched to "1", that is, to the voltage of the internal positive line 76, and as a result a current pulse 86 (FIG. 14a) flows to the Hall ICs 37, 38. Not until this current has flowed for a few microseconds can the signals H1, H2 be read out by the μP 72, and therefore a time lag occurs as a result of step S202, for instance by means of several NOP commands.

After step S202 has elapsed, the signals H1, H2 are read and stored in the μP 72 in step S202. Next, in step S206, the output RA3 of the μP 72 is reset to "0"; that is, the two Hall ICs 37, 38 are made currentless again, and so they consume no energy, which increases the efficiency of the motor 30.

S208 in FIG. 15 in general designates the steps of FIG. 9 (from S134 to S158) in which the values H1 and H2 are evaluated. The times that are needed for various successions of steps upon a passage through the loop S150 are also shown as examples and schematically in FIG. 15.

If none of the values H1, H2, H3B has been changed, then the program moves to step S160, where it checks whether the flag (see step S140) is set. This flag indicates that the value of H3B must be changed soon, because a commutation is about to occur. If that is not the case, that is, if flag=0, then the program moves directly to step S154 and then to step S158 and back through the loop S150, with the counter Z being raised by the value 1.

If in step S160 the flag=1, then the program goes to step S162, where it is checked whether the counter Z has already reached the value of the "control value" variable (see step S132).

If in step S162 the counter state is less than "control value", then the program goes to step S154, and then in step S158 the counter state is again raised by one. The commutation by the signals T1–B3 is maintained unchanged, as long as nothing changes in the signals H1, H2 and H3B.

If in step S162 the counter state is greater than "control value", then the program moves to step S164. There, the former value of H3B is replaced by the value "logic level", and the already-described flag (steps S140 and S160) is reset to flag=0, so that the steps S162 and S164 are subsequently not run through continuously.

The signal H3B now has a new value, which corresponds to the instantaneous rotor position, and so the transistors of the bridge circuit 94 are correctly controlled in accordance with this rotor position. After each change in one of the signals H1, H2, H3B, the steps S136 etc. are in fact run through over again, and the commutation of the motor 30 is changed accordingly, as can be seen directly from the flowchart.

If the estimated signal H3B" is wrong and the motor therefore does not start, then the step S158 is run through quite frequently, and as a result the counter state of the counter Z increases accordingly, and if a time of more than 30 ms has elapsed, the decision stage S154 causes a switchover to step 156, where this wrong value H3B" is replaced by its complementary value H3B"C; for instance, the estimated value "0" is replaced by the correct value "1" or vice versa, after which the motor starts up immediately with full torque.

How is the motor, while running, commutated correctly? Reference will now be made to FIG. 12, where the signals H1, H2, H3B are shown on the left concatenated in their (invariable) chronological order (for clockwise rotation of the motor 30). Thus one always knows that the signal 110, for instance, must be followed by the signal 010, and that the signal 101 must be followed by the signal 100.

This knowledge alone, however, is entirely inadequate, because one must also know at which moment the transition between these signals, the so-called commutation, takes place. The motor 30 furnishes only some of the signals for this, because after all it is precisely the third sensor, which could furnish this information, that is missing.

For instance, from the change in the signal H2, one knows when the commutation from the signal 100 to the signal 110 takes place. From the change in the signal H1, one also knows at what moment the commutation from the signal 110 to the signal 010 occurs. Since no sensor for the signal H3B is present, however, one does not know at what moment the commutation from the signal 010 to the signal 011 occurs, or conversely from the signal 101 to the signal 100.

It therefore appears initially that a correct commutation between these last signals is not possible.

Figure 12:
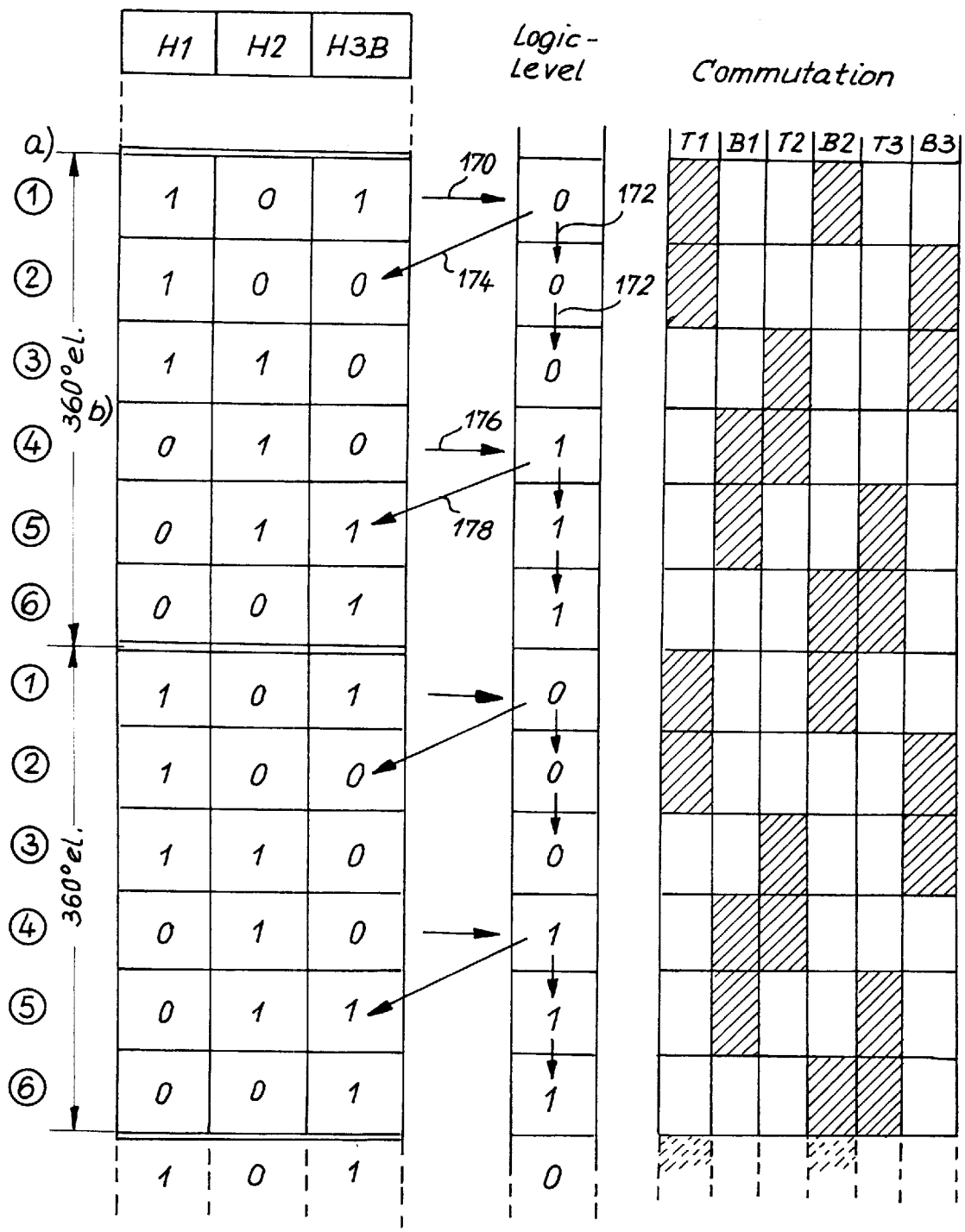
Figure 13:
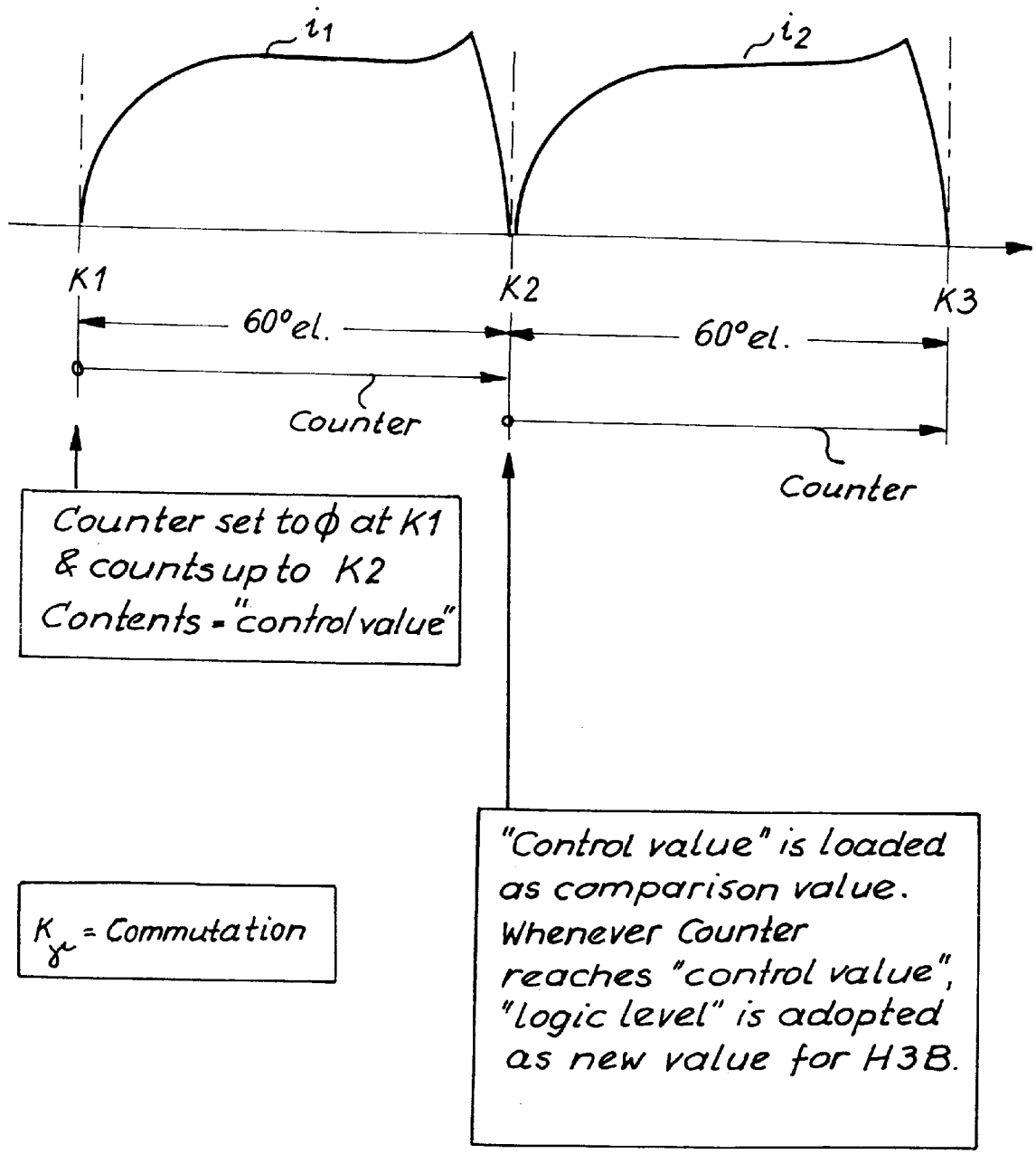

This dilemma is overcome with the stratagem shown in FIG. 13. There, the period of time between the commutation times K1 and K2 is intended to be equivalent to the rotary position range (3). Its onset K1 is marked by the fact that the output signal H2 of the Hall IC 38 changes from "0" to "1", and its end K2 is marked by the change in the outlet signal H1 of the rotor position sensor 37 from "1" to "0"; see FIG. 12. Thus these two times K1 and K2 are defined exactly by signals from the motor 30. The time span from K1 to K2 is measured with the counter Z and used as the "control value" for the ensuing counting process. This time span is practically invariable during a revolution of the rotor 35; that is, at most it fluctuates within very narrow limits, and these fluctuations can even be eliminated, if desired, by means of moving averaging (not shown).

The time K3 at which the signal H3B changes from "0" to "1" cannot be learned from the motor 30, as has just been noted, since the corresponding sensor is missing; this point in time is therefore considered to have been reached when the counter Z, measured from K2, has reached the value "control value" (that is, the chronological distance between K1 and K2). At time K3, the virtual signal H3B is accordingly switched over, and a commutation is thus brought about; the correct new value for H3B is derived from the previous values.

FIG. 12 shows how this is done. For instance, in the rotor position range (1), by means of program step S142, the logic level is made "0", as indicated by the arrow 170 in FIG. 12. The logic level "0" is maintained until it is actively changed, as indicated by the arrows 172.

At the transition from the rotor position range (1) to the range (2), it is determined by step S162 that the time "control value" has elapsed, and therefore in step S164 the former value H3B=1 is replaced by the value of the logic level and becomes H3B=0, and the correct commutation takes place at the correct time K3. This is indicated in FIG. 12 by the arrow 174. In step S152, shortly thereafter, the motor 30 is also commutated in accordance with this new value of H3B.

The reverse process takes pace upon commutation from the rotor position range (4) to the range (5). In the range (4), by the positive interrogation in step S136, the logic level "1" is then generated in step S138 (arrow 176 in FIG. 12), and in step S140, the flag is set such that flag=1. If then in step S162 it is found that the time "control value" has been exceeded, then in step S164 the former value H3B=0 is replaced by the logic level "1" (arrow 178 in FIG. 12), and the flag bit is reset to "0"; that is, H3B is commutated at the chronologically correct moment from "0" to "1", and as a result in step S152 the motor 30 is then correctly commutated as well.

FIG. 12, on the right, shows the course of commutation of the full-bridge circuit 94, which takes place in the correct pattern as soon as the motor 30 first runs, or in other words as soon as the signals H1 and H2 change as a result of the rotation of the rotor 35.

By means of the invention (in combination with the supply of the current pulses 86 to the Hall ICs 37, 38), it is successfully possible, even in a low-power electronically commutated motor, for instance one with 0.5 watts of output power, to achieve an acceptable efficiency of about 30%. This is especially valuable in motors that are operated with solar power or from batteries, or in devices with the environmental seal of approval (Green Seal), for instance in fans for computers, monitors or any kinds of electrical equipment.

Naturally within the scope of the invention, manifold alterations and modifications are possible. For instance, the invention is equally suitable to motors that must run both backwards and forwards, in which case for the reverse direction the opposite sequence of rotor position signals must be attended to; that is, the table of FIG. 12, left, should then be read from bottom to top, and the control of the phases 31, 32, 33 of the motor 30 then takes place correspondingly in the other way, so that once again a mean current flow phase of 90° el. can be attained. Different estimated values H3B" must also be used then. This is not shown, because it is self-evident to one skilled in the art.

Naturally, in the reverse course, in the logic level (steps S138 and S144), the values "0" and "1" must be stored at different rotary positions in order to achieve correct commutation. This can be seen directly from FIG. 12, because the change of the signal to "logic level" must always occur chronologically before the commutation.

The invention is naturally equally suitable for a three-pulse, three-phase electronically commutated motor, of the kind for instance shown and described in the article by Rolf Müller, in *asr-dicrest für angewandte Antriebstechnik*, 1977, pp. 27–31.

Figure 16:
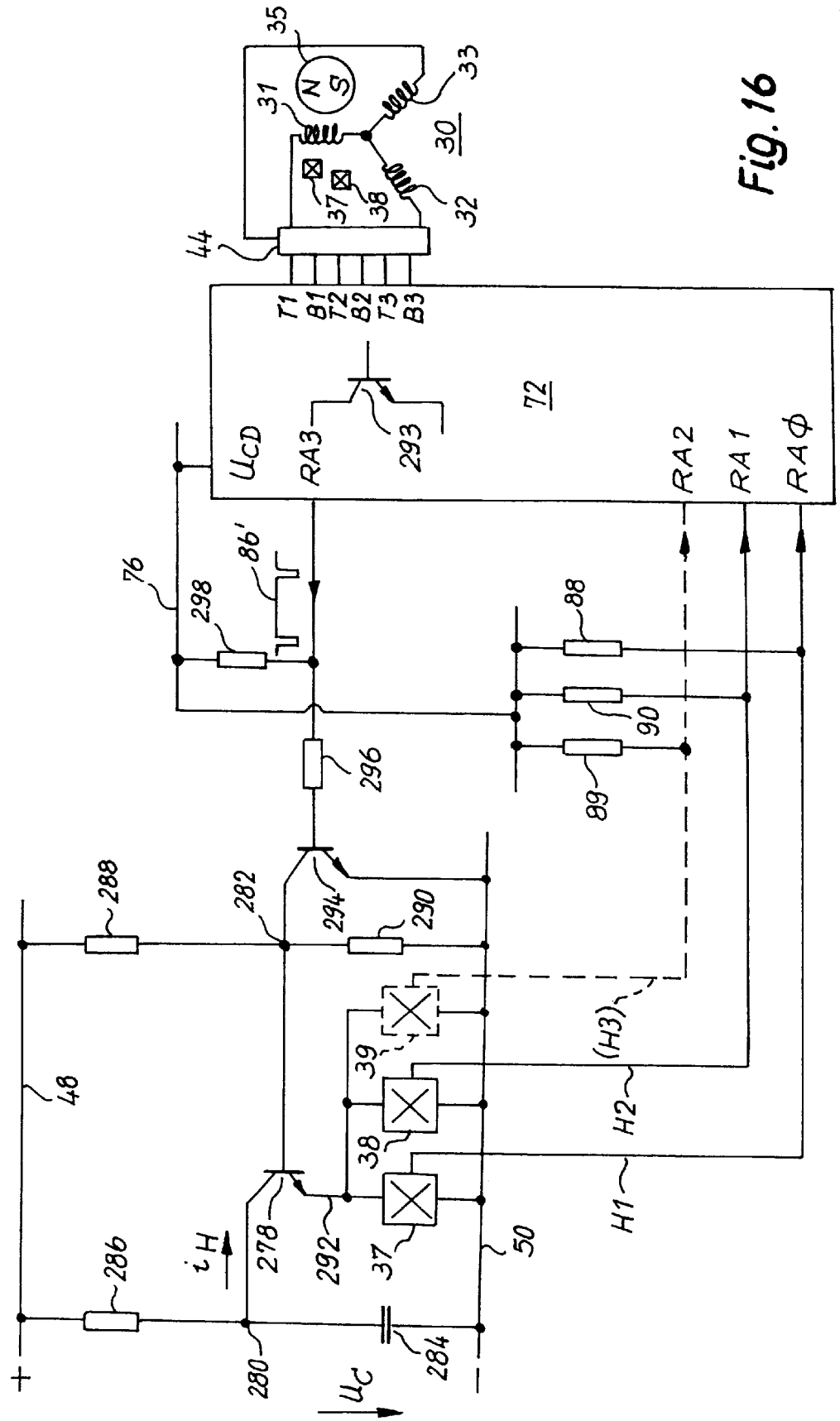

In FIG. 6, the Hall ICs 37, 38 are supplied with current directly via the μP 72. If a motor uses a plurality of Hall ICs, then the μP 72 could become overloaded by the currents required for the purpose. FIG. 16 shows a circuit with two Hall ICs 37, 38 and optionally a third Hall IC 39, which generate Hall signals H1, H2 and optionally H3, which are delivered to three inputs RA0, RA1 and RA2, respectively, of the μP 72 and are buffer-stored there as corresponding digital signals. These inputs are each connected to the internal positive line 76 via a respective resistor 88, 90 and 89. These are the so-called "pullup resistors" of the Hall ICs.

Each of the Hall ICs 37, 38, 39 are connected by their GND terminal to the negative line 50 and by their positive terminal 292 are connected jointly to the emitter of an npn transistor 278 (BC847C, for instance), whose collector is connected to a node point 280 and whose base is connected to a node point 282.

Located between the node point 280 and the negative line 50 is a storage capacitor 284 (100 nF, for instance), which acts as a voltage buffer for the supply to the Hall ICs and which is charged, between the current pulses iH flowing to the Hall ICs, from the positive line 48 (for instance, +40 V) via a resistor 286 (1 kΩ, for instance). As a result of the Hall pulses, the voltage $u_c$ at the capacitor 284 drops briefly each time, causing this voltage $u_c$ to have an approximately sawtooth course in operation.

The node point 282 is connected to the positive line 48 via a resistor 288 (39 kΩ, for instance) and to the negative line 50 via a resistor 290 (22 kΩ, for instance). The potential of the point 282 is accordingly determined by the voltage divider ratio of the resistors 288 and 290, and since the transistor 278 is connected as an emitter follower, this potential of the point 282 also determines the potential of the emitter of the transistor 278, which is accordingly always somewhat more-negative than the potential of the node point 282. The effect is accordingly a constant voltage at the positive terminal 292 of the Hall ICs 37, 38 and 39, as long as these ICs receive current.

Parallel to the resistor 290 is the emitter-to-collector path of an npn transistor 294 (BC847C, for instance), whose base is connected via a resistor 296 (22 kΩ) to the output RA3 of the μP 72 and from there receives control signals 86'. This output is connected to the internal positive line 76 via a resistor 298 (22 kΩ, for instance).

As long as the transistor 294, because it receives a base current via the resistor 296, is conducting, it bridges the resistor 290, and thus the node point 282 receives a potential that is approximately equivalent to the potential of the negative line 50. This blocks the transistor 278, because it receives no base current, and the three Hall ICs are currentless, so that the capacitor 284 can charge via the resistor 286.

If the output RA3 of the μP 72 is connected internally by means of a merely schematically indicated transistor 293) to the negative line 50, then the transistor 294 blocks, and the point 282 assumes a potential equivalent to the voltage divider ratio of the resistors 288 and 290, such as +20 V. Consequently, a voltage of +19 V, for instance, is obtained at the emitter of the transistor 278, and a current $i_H$ flows from the capacitor 284 to the Hall ICs 37, 38 and optionally 39; the voltage at these Hall ICs is kept at the voltage divider level of the resistors 288 and 290, regardless of the charge voltage of the capacitor 284 and regardless of the applied operating voltage of the motor. The current pulses iH are hardly perceptible at the positive line 48 and are distributed over time, so that overall the motor current decreases considerably, since all the Hall ICs 37, 38, 39 need, instead of a continuous current of 45 mA, for instance, is only a current whose mean value over time is between 5 and 10 mA, for instance. The efficiency of the motor is considerably improved as a result. If only two Hall ICs 37, 38 are used, then this mean value over time becomes even lower, and the efficiency becomes even better.

A further advantage of the circuit of FIG. 16 is that the currents iH that flow to the Hall ICs do not affect the voltage $U_{CD}$ at the µP 72 and can therefore not cause any problems in the microprocessor. Only a relatively small capacitor 284, for instance of 100 nF, is therefore needed in FIG. 16.

The motor 30 of FIG. 16 has three strands. Naturally, with a circuit in accordance with FIG. 16, one can operate any arbitrary electronically commutated motor that is controlled by one or more rotor position sensors, such as a two-pulse motor having only one Hall IC. Because of the increase in efficiency, motors according to the invention are especially suitable for mobile applications or for applications using solar power. In particular, it can be highly advantageous for the operation of reading off the signal of the rotor position sensor to be coupled with a reset operation that is internal in the program and that occurs preferentially at certain rotary positions of the rotor in such motors.

When a plurality of Hall ICs are used, instead of supplying them all simultaneously and jointly with current, as is shown in FIG. 16, it may also be advantageous to connect the various Hall ICs to separate outputs of the µP 72, thus to connect the first Hall IC to a first output, the second Hall IC to a second output, and so forth, and to control these outputs separately by means of the program. One can then turn these Hall ICs on and interrogate or poll them one after the other, sequentially, and thus distribute the current demand over time. Such modifications, as well as others, are within the scope of the invention. In particular, features of one embodiment may be combined with features of another embodiment. Therefore, the invention is not limited to the specific embodiments shown and described, but rather is defined by the following claims.

What is claimed is:

1. A method of operating an electronically commutated motor having at least three stator winding strands and a rotor which, to detect an instantaneous position of said rotor, has a number of signal-producing rotor position sensors which is smaller, by at least one, than a number of rotor position sensors intrinsically necessary for this number of strands in order to control commutation of said motor, having the following steps:
   (a) deriving within each range of rotor positions in which an adequate association between sensor output signals and rotor position is possible, a virtual rotor position signal (H3B') from the output signals of said rotor position sensors, as a substitute for the output signal of a sensor which is not present; and
   (b) using, within each range of rotor positions in which an adequate association is not possible, an estimated value for the virtual rotor position signal, which value is a function of an output signal (H1) of at least one of the existing rotor position sensors.

2. The method of claim 1, in which, in step (b), an inverse value of the output signal of one of the existing rotor position sensors is used as the estimated value.

3. The method of claim 2, in which, in the case where an estimated value is used, choosing this value such that upon starting of the motor, from a rotor position (a, b) unfavorable for purposes of starting, the current flow phase (β) is adjusted to a higher value than in cases in which an adequate association of the virtual rotor position signal with the existing output signals is possible.

4. The method of claim 1, in which following step b), the estimated value for the virtual rotor position signal is replaced by its complementary value, whenever a predetermined period of time has elapsed without any change in output signals of any of the existing rotor position sensors.

5. A method of operating an electronically commutated motor having at least three strands and a rotor which, to detect an instantaneous position of said rotor, has a number of signal-producing rotor position sensors which is smaller, by at least one, than a number of rotor position sensors intrinsically necessary for this number of strands, in order to control commutation of said motor, having the following steps:
   a) in operation, that is, with the rotor in rotation, calculating, in advance, the value, which a calculated rotor position sensor signal will have after a subsequent commutation, from a sequence of signals controlling commutation of said motor;
   b) measuring a time interval ("control value"), between two successive commutation instants (FIG. 13: K1, K2), which are defined by a change in the rotor position signals of existing rotor position sensors; and
   c) comparing the thus-measured value ("control value"), from the following commutation instant on, with the time span elapsed beginning from that commutation instant, and when the measured value ("control value") is equalled, causing the former value of the calculated rotor position signal to be replaced by said value calculated in advance in accordance with step (a).

6. The method of claim 5, further comprising
   periodically interrupting supply of power to the rotor position sensors during operation, and
   during a period when said sensors are supplied with power, reading out their output signals for purposes of further processing.

7. The method of claim 6, further comprising the step of reading out the output signal of a rotor position sensor in each case during a terminal phase of a time period during which this rotor position sensor is turned on.

8. The method of claim 6, further comprising synchronizing the turn-on of a rotor position sensor with running of a program which runs in a microprocessor which controls the motor.

9. The method of claim 8, in which the program runs through loops and, during each passage through a loop, a rotor position sensor is supplied, at least once briefly, with current.

10. An electronically commutated motor having at least three stator winding strands,
   having a first rotor position sensor for generating a first rotor position signal,
   having a second rotor position sensor for generating a second rotor position signal, both of which rotor position signals enable the identification of a subset of rotor positions for commutating the currents in the three strands, and
   having an arrangement, controlled by output signals of the two rotor position sensors, for estimated identification of a further subset of rotor positions, in order to preclude startup of the motor opposite the correct direction of rotation from each rotor position in the two subsets.

11. The motor of claim 10, in which signal generating means are provided for assigning an estimated signal value to at least one predetermined combination of rotor position signals of said two rotor position sensors, which estimated value, in combination with the first and second rotor position signals, increases a likelihood of identification for identifying rotor positions in said second subset.

12. The motor of claim 11, in which verification means are provided, which control the verification of correctness of the estimated value and control its correction, if said estimated value is incorrect.

13. The motor of claim 12, in which
said verification means include a timer, which monitors whether, within a predetermined period of time after the turn-on of the motor, a change occurs in either of a first rotor position signal and a second rotor position signal.

14. The motor of claim 13, in which the verification means corrects the estimated value if, within the predetermined period of time, no change occurs in either of the first rotor position signal and the second rotor position signal.

15. The motor of claim 10, having a microprocessor controlling the commutation of the motor, wherein a current, for actuating at least one rotor position sensor provided in this motor, is turned on repeatedly by the microprocessor for an ON period, and is turned off during an OFF period whose duration exceeds that of the ON period.

16. The motor of claim 15, in which the microprocessor has internal memory for storing a rotor position signal detected upon turn-on of a rotor position sensor.

17. A method of controlling operation of an electronically commutated motor having a rotor, a stator having at least three stator winding strands, and rotor position sensor means for providing respective rotor position signals dependent upon an actual position of said rotor, comprising the steps of:
controlling supply of current to said stator winding strands in dependence upon an actual combination signal concatenating the respective rotor position signals;

calculating in advance a predicted value, in a rotor signal combination, of a future rotor position, based upon said actual rotor position signal combination;

measuring a time interval between a first change of said rotor signal combination and a subsequent second change of said rotor signal combination;

storing said time interval;

measuring, beginning from said second change, a period of time substantially corresponding to said stored time interval; and inputting said predicted value, or a value derived therefrom, into said rotor signal combination when said time interval has elapsed, to thereby control supply of current to said winding strands by a rotor signal combination including said predicted value.

18. A method of operating an electronically commutated motor having at least one rotor position sensor comprising the steps of:

during operation, periodically interrupting supply of power to the rotor position sensor;

during a final phase of a time segment during which the power supply of the rotor position sensor is turned on, reading out each output signal of the rotor position sensor for further processing.

19. The method of claim 18, further comprising the step of synchronizing turn-off and turn-on of the rotor position sensor with execution of a program that runs in a microprocessor controlling said motor, in order to supply the program with a rotor position signal whenever such a signal is required by the program, or whenever a cyclically repeated reset operation occurs internally in said program.

20. The method of claim 19, in which the program runs through loops and, during each loop, the rotor position sensor is supplied at least once briefly with current.

21. The method of claim 18, in which the ratio, of an ON time segment to an OFF time segment of the rotor position sensor, amounts to not more than about 20%.

* * * * *

UNITED STATES PATENT AND TRADEMARK OFFICE
CERTIFICATE OF CORRECTION

PATENT NO. : 6,163,117
DATED : December 19, 2000
INVENTOR(S) : Rappenecker

It is certified that error appears in the above-identified patent and that said Letters Patent is hereby corrected as shown below:

Title Page,
Item [56] Foreign Patent Documents, 37 24 895 A1 2/1995" should read
--37 24 895 A1 2/89--

Column 1,
Line 6 "PIC16CSZ" should be --PIC16C5Z--

Column 2,
Line 37, "2A" should be --2B--
Line 41, "2b" should be --2A--

Column 5,
Lines 54 and 57 "Hi" should be --H1--

Column 6,
Line 17 "volt" should be --voltage--
Line 26 "Hi" should be --H1--

Column 11,
Line 33 "re-interrogate" should be --re-interrogated--

UNITED STATES PATENT AND TRADEMARK OFFICE
CERTIFICATE OF CORRECTION

PATENT NO. : 6,163,117
DATED : December 19, 2000
INVENTOR(S) : Rappenecker

It is certified that error appears in the above-identified patent and that said Letters Patent is hereby corrected as shown below:

Column 14,
Line 2 "*asr-dicrest*" should be --*asr-digest*--

Signed and Sealed this

Third Day of July, 2001

*Attest:*

*Attesting Officer*

NICHOLAS P. GODICI
*Acting Director of the United States Patent and Trademark Office*